United States Patent [19]

Youngquist et al.

[11] Patent Number: 5,390,054
[45] Date of Patent: Feb. 14, 1995

[54] METHOD AND SYSTEM FOR MINIMIZING THE ERROR RATE OF A DIGITAL RECORDING SYSTEM BY PREDICTING THE OPTIMAL BIAS CURRENT

[75] Inventors: Robert Youngquist, White Bear Lake; Theodore Schwarz, Woodbury; Richard Molstad, St. Paul; Tim Ngo, Maplewood, all of Minn.

[73] Assignee: Minnesota Mining and Manufacturing Company, St. Paul, Minn.

[21] Appl. No.: 30,800

[22] Filed: Mar. 12, 1993

[51] Int. Cl.$^6$ ............................................. G11B 5/03
[52] U.S. Cl. ................................................. 360/66
[58] Field of Search ....................... 360/66, 67, 113, 46

[56] References Cited

U.S. PATENT DOCUMENTS

| | | | |
|---|---|---|---|
| 3,016,507 | 1/1962 | Grant et al. | 338/32 |
| 3,967,368 | 7/1976 | Brock et al. | 360/113 |
| 3,979,775 | 9/1976 | Schwarz | 360/113 |
| 4,050,086 | 9/1977 | Harr | 360/66 |
| 4,277,808 | 7/1981 | Nagaki | 360/113 |
| 4,439,671 | 3/1984 | Helle | 235/449 |
| 4,523,243 | 6/1985 | Billington | 360/113 |
| 4,712,144 | 12/1987 | Klaassen | 360/67 |
| 4,717,979 | 1/1988 | Washisu | 360/113 |
| 4,802,043 | 1/1989 | Sato et al. | 360/113 |
| 4,967,298 | 10/1990 | Mowry | 360/113 |
| 5,081,554 | 1/1992 | Das | 360/113 |
| 5,159,511 | 10/1992 | Das | 360/113 |
| 5,301,080 | 4/1994 | Ottesen et al. | 360/66 |

FOREIGN PATENT DOCUMENTS 4-67304  3/1992  Japan .

Primary Examiner—Donald Hajec
Assistant Examiner—Won Tae C. Kim
Attorney, Agent, or Firm—Gary L. Griswold; Walter N. Kirn; Eric D. Levinson

[57] ABSTRACT

A digital recording system utilizing a magnetoresistive transducer in a magnetic recording head. The system measures the amplitude of an output signal, $E_o$, from the transducer for various bias currents as a recorded magnetic media passes by the head. The system then determines the bias current for which the output signal, $E_o$, is maximized and multiplies that bias current by a suitable factor. The system then operates at the calculated bias current level, thereby minimizing the error rate of the system.

8 Claims, 2 Drawing Sheets

METHOD AND SYSTEM FOR MINIMIZING THE ERROR RATE OF A DIGITAL RECORDING SYSTEM BY PREDICTING THE OPTIMAL BIAS CURRENT

FIELD OF THE INVENTION

This invention relates generally to digital recording systems for recording on magnetic media, and more specifically to digital systems which employ magnetoresistive transducers.

BACKGROUND OF THE INVENTION

Digital recording systems typically include means for moving magnetic media past writing and reading heads. The reading heads in such systems commonly include one or more magnetoresistive (MR) transducers for reading the magnetic media. The error rate of a digital recording system is defined as the number of bits incorrectly detected divided by the total number of bits transferred. The system error rate is dependent upon the bias current that is passing through the magnetoresistive transducer. If the bias current is too low, the MR transducer will be underbiased and the resultant output signal will be distorted, and thus will have a high error rate. If the bias current is too high, the MR transducer will be overbiased and the resultant output signal will be distorted, and thus will also have a high error rate. Somewhere between the bias currents which yield underbiased and overbiased signals lies a range of bias currents where the MR transducer is optimally biased. Within this range of bias currents the error rate is minimized.

Typically, manufacturers of MR transducers determine their optimum bias current by conventional methods such as by measuring the second harmonic distortion of the output signal, or by comparing the asymmetry of the amplitudes of isolated pulses. Once this optimized bias current is determined it is used for all MR transducers of the same design.

However, because of manufacturing tolerances in the magnetic head relating to the height and resistivity of the MR transducer stripe, the amount of bias current required to minimize the error rate will vary from head to head. Furthermore, over time, magnetic media passing over the magnetic head will wear down the MR transducer stripe, which will affect its height. Changes in the height of the MR transducer stripe will in turn affect the resistance of the MR transducer and the amount of bias current required to minimize the system error rate.

SUMMARY OF THE INVENTION

The present invention minimizes the error ram for a digital recording system by optimizing the bias current for an MR transducer. Thus, the invention compensates for variations in the height and resistivity of each individual MR transducer stripe. Furthermore, the invention changes the value of the optimum bias current as necessary to compensate for changes in the height and effective resistance of the MR transducer over time.

The method of the invention includes the following steps. As a recorded magnetic media is passed by an MR transducer, the amplitude of the output signal, $E_o$, from the MR transducer is measured for a first bias current. The first bias current is then changed at least once, and preferably at least twice, to new bias currents, and the amplitudes of the respective output signals, $E_o$, are measured. The amplitudes of the output signals, $E_o$, are then used to predict the optimized bias current. The bias current is then set at the optimized level.

The optimized bias current can be predicted by determining the bias current for which the output signal amplitude is maximized, $E_{omax}$. That bias current can then be multiplied by a factor of about 0.8 to 1, preferably about 0.9.

In the alternative, the optimized current can be predicted by first normalizing the amplitudes of the output signal amplitudes, $E_o$, by dividing each of them by their corresponding bias current, and then determining the bias current for which the normalized output signal amplitude is maximized, $E_{nmax}$. That bias current can then be multiplied by a factor of about 1 to 1.25, preferably about 1.15. The optimized bias current can also be predicted by averaging $E_{omax}$ and $E_{nmax}$.

The invention also includes a digital recording system for performing the method described above. The system can include a microprocessor and a means for convening analog signals to digital data. The system is preferably a magnetic media drive, and more preferably a data cartridge drive.

BRIEF DESCRIPTION OF THE DRAWINGS

The invention will now be described by referring to the following Figures, in which.

DETAILED DESCRIPTION

Figure 1:
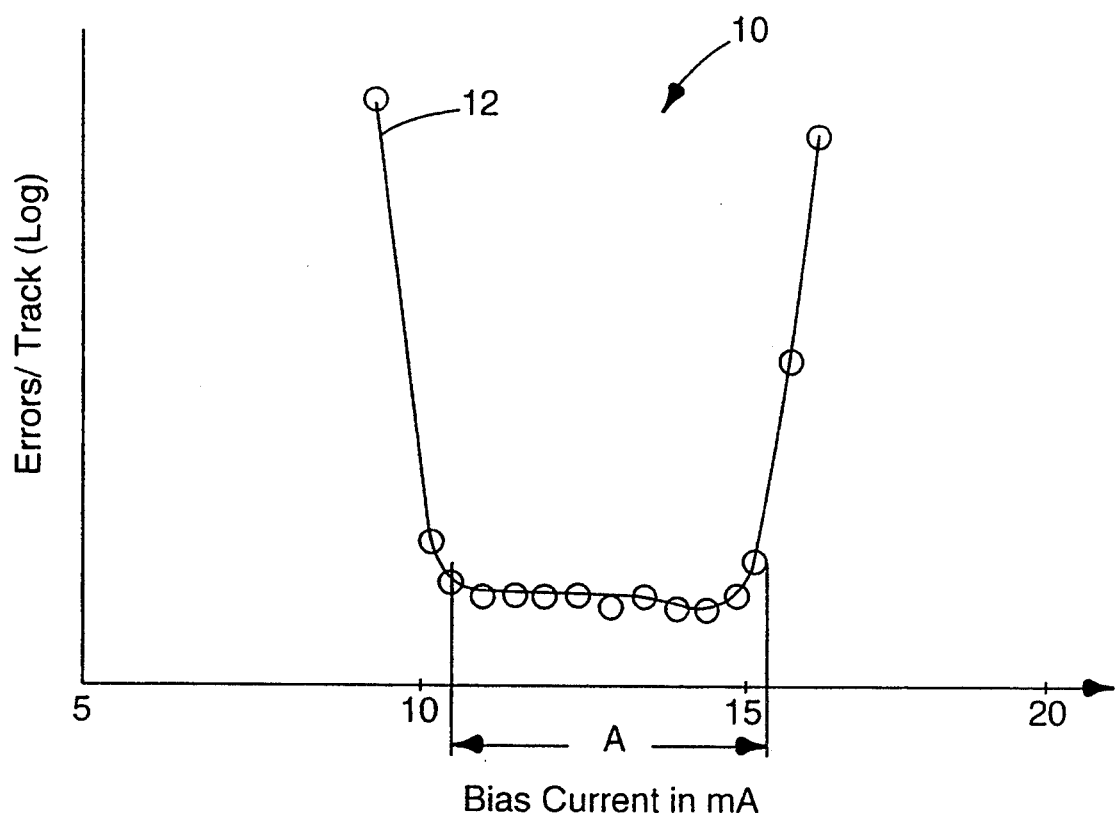
FIG. 1 is a graph of the number of errors per track as a function of bias current.

A graph 10 in FIG. 1 shows the error rate for a digital recording system employing an MR transducer as a function of the bias current passing through the transducer. The logarithm of the error rate per track is shown as a line 12. The shape of the line 12 indicates that the system error rate is minimized if the bias current is maintained within the range of currents A.

Figure 2:
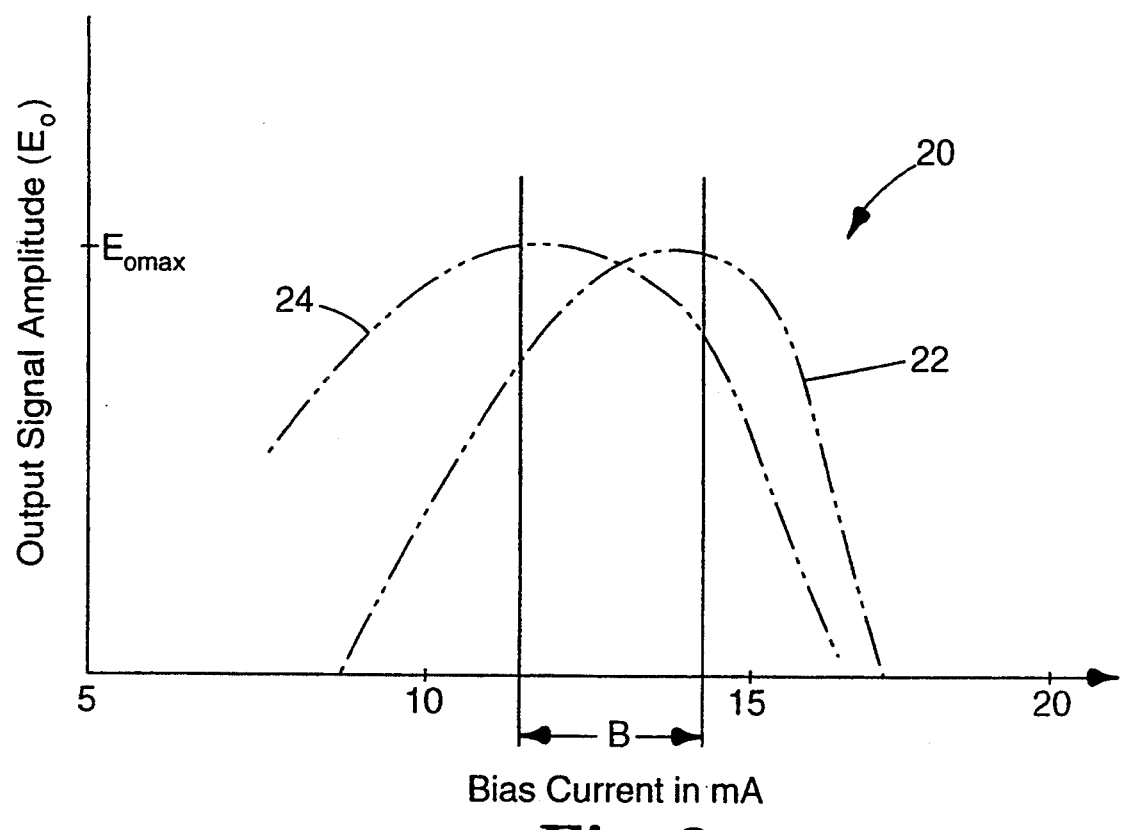
FIG. 2 is a graph of both the output signal amplitude, $E_o$, and normalized output signal amplitude, $E_n$, as a function of bias current according to the invention.

A graph 20 in FIG. 2 shows the output signal amplitude as a function of the bias current passing through the transducer. The output signal amplitude, $E_o$, is represented by a phantom line 22. The peak of the line 22 defines the maximum output signal amplitude, $E_{omax}$. This peak, $E_{omax}$, defines the upper limit of bias currents contained within the range of currents B.

The line 22 representing the output signals, $E_o$, can be normalized by dividing each output signal by its corresponding bias current, thereby deriving the normalized output signal amplitude, $E_n$, represented by a phantom line 24. The peak of the line 24 defines the maximum normalized output signal amplitude, $E_{nmax}$, which defines the lower limit of the range of bias currents B. In FIG. 2, line 24, representing $E_n$, is further normalized so that its amplitude is equal to the amplitude of $E_{omax}$.

Figure 3:
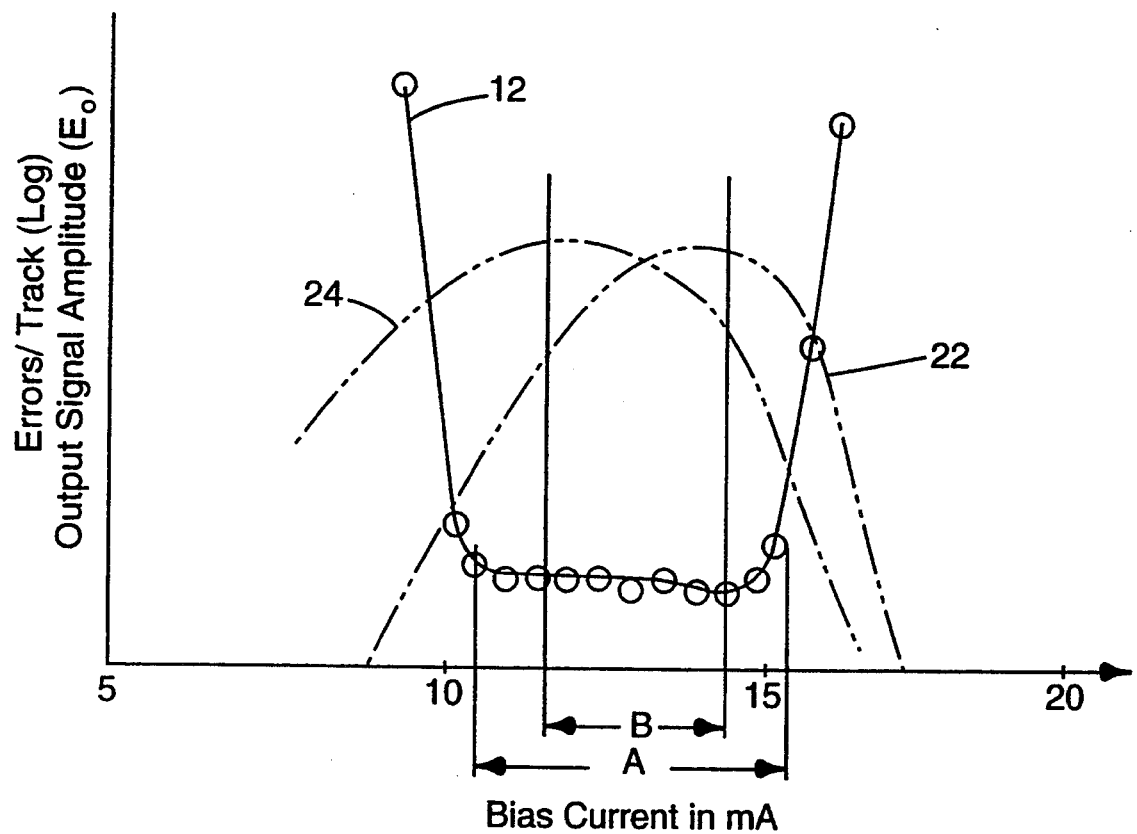
FIG. 3 shows the graph of FIG. 2 superimposed onto the graph of FIG. 1.

FIG. 3 shows the graph 20 in FIG. 2 superimposed on the graph 10 in FIG. 1. The phantom lines 22 and 24 representing $E_o$ and $E_n$, respectively, are shown superimposed over the line 12 representing the system error rate. This superimposition shows that the range of currents B is within the range of currents A. Thus, measurements of the output signal amplitude, $E_o$, may be used to predict a bias current that is within the range of bias currents A for which the error rate is minimized.

Either $E_{omax}$ or $E_{nmax}$, or both, can be used to predict the optimized bias current. If $E_{omax}$ is used, the optimized bias current should preferably be set at a value within the range of from 80% to 100% of the bias current for $E_{omax}$, more preferably at about 90%. If $E_{nmax}$ is used, the optimized bias current should preferably be set at a value within the range from about 100% to 125% of the bias current for $E_{nmax}$, and more preferably at about 115%.

In the alternative, both $E_{omax}$ and $E_{nmax}$ can be predicted, and the two respective bias currents can be averaged to arrive at the optimized bias current. This optimized bias current resulting from the average bias currents from $E_{omax}$ and $E_{nmax}$ could then be multiplied by a suitable factor, if necessary, which could be slightly more or less than 1.

Figure 4:
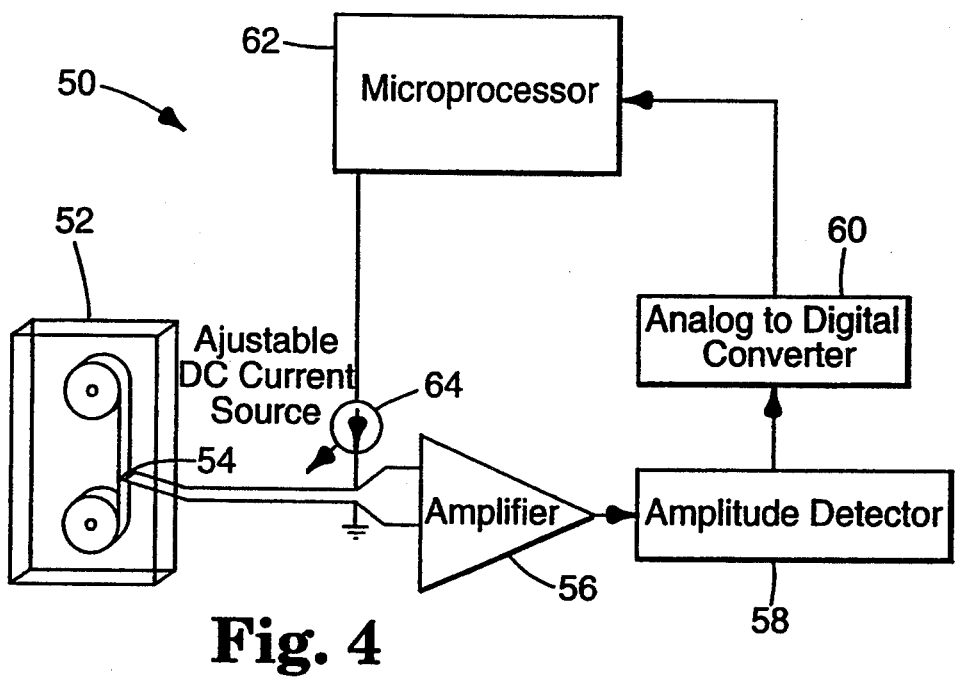
FIG. 4 is a schematic diagram of a digital recording system for minimizing system error rate according to one embodiment of the invention.

A digital recording system 50 for carrying out the above method is shown in FIG. 4. The system 50 includes an MR transducer 54, an amplifier 56, an amplitude detector 58, an analog to digital converter 60, a microprocessor 62, and an adjustable DC current source 64.

The system 50 is preferably a magnetic media drive, such as a data cartridge drive. Recorded magnetic media 52 is preferably magnetic tape in a data cartridge, but can be any type of magnetic media, so long as it is compatible with the system 50. The MR transducer 54 is preferably a shielded magnetoresistive read head having a shunt-biased design with two terminals.

In order to operate the system 50, the recorded magnetic media 52 is moved past the MR transducer 54. A bias current supply means, such as the adjustable DC current source 64, supplies a first bias current through the MR transducer 54. This produces an output signal, $E_o$, from the MR transducer 54. This output signal, $E_o$ can be amplified by the amplifier 56. A measuring means, such as the amplitude detector 58, measures the amplitude of the output signal, $E_o$, from the MR transducer 54 for the first bias current.

The measured amplitude for the first bias current can be converted from an analog signal to digital data by the analog-to-digital converter 60. The measurement data is then relayed for storage to a calculating means, such as the microprocessor 62.

A bias current changing means, such as the adjustable DC bias current source 64, is then adjusted to supply a slightly higher or lower bias current than the first bias current. The amplitude of the output signal, $E_o$, from this second bias current is then measured by the measuring means. The signal is then converted to digital data by the converter 60 and is relayed to the calculating means.

The calculating means analyzes the amplitude signals from each of the bias currents to predict which bias current provides the lowest system error rate. The calculating means then signals to the bias current changing means to adjust the bias current to the optimized level.

Preferably, the bias current is changed at least twice so that at least three output signals, $E_o$, are measured and analyzed. The bias current supply means could be started at some low bias current and could be stepped-up several notches, while measuring the output signal amplitude, $E_o$, for each changed current.

The calculating means preferably determines the bias current for which the output signal amplitude, $E_o$, or the normalized output signal amplitude, $E_n$, is maximized. This can be done by selecting the bias current having the largest $E_o$ or $E_n$, or by providing a stored program in the calculating means which allows for the generation of a curve of best fit of the output signals, $E_o$, from which the true $E_{omax}$ or $E_{nmax}$ can be derived.

As explained earlier, the optimized bias current can be predicted by multiplying the bias current for $E_{omax}$ by a factor within the range of from about 0.8 to 1, and more preferably about 0.9. In the alternative, the optimized bias current can be predicted by multiplying the bias current for $E_{nmax}$ by a factor within the range of from about 1 to 1.25, and more preferably about 1.15. A second alternative is to take an average of the bias currents for $E_{omax}$ and $E_{nmax}$.

The method of the present invention for minimizing the error rate can be employed as frequently as necessary to ensure that the bias current is set at the preferred level. This may require that the method be employed each time a magnetic media (e.g., data cartridge) is inserted into the drive, or each time the drive is started-up. It would also be possible to employ the method of the invention continuously whenever the magnetic media is moving in the drive.

The amplifier 56 can be an AC coupled high gain device having a gain of perhaps 1,000:1. The amplifier 56 can also include a filter. The amplitude dectector 58 can be a device that produces a DC output which is proportional to the amplitude of the input waveform. The detector 58 may respond to the root-mean-squared value of the input or the waveform peak. The adjustable DC current source 64 can reside within a pre-amplifier and could be controlled via a three wire serial control bus.

We claim:

1. A digital recording system, including:
    means for applying a bias current through a magnetoresistive transducer;
    means for changing the bias current;
    means for measuring the amplitude of art output signal, $E_o$, produced by the transducer for each of the bias currents as a recorded magnetic media is transported thereby;
    calculating means, responsive to the measured amplitudes, for predicting an optimized bias current for which the system error rate is minimized, wherein the calculating means predicts the optimized bias current by taking an average of: (1) the bias current for which the output signal amplitude is maximized, $E_{omax}$, and (2) the bias current for which the normalized output signal amplitude is maximized, $E_{nmax}$, wherein the normalized output signal, $E_n$, is derived by dividing each output signal, $E_o$, by its bias current; and
    means, responsive to the calculating means, for signaling the changing means to adjust the bias current to the optimized bias current.

2. A method of minimizing the error rate of a digital recording system, including:
    a) passing a recorded magnetic media past a magnetoresistive transducer;
    b) measuring the amplitude of an output signal, $E_o$, from a magnetoresistive transducer for a first bias current through the transducer;
    c) changing the bias current through the transducer at least twice;

d) measuring the amplitude of an output signal, $E_o$, from the transducer for each changed bias current;

e) determining the bias current for which the output signal amplitude is maximized, $E_{omax}$, thereby predicting an optimized bias current for which the system error rate is minimized; and f) setting the bias current approximately equal to the optimized bias current.

3. The method of claim 2, further including multiplying the bias current for $E_{omax}$ by a multiplication factor within the range of from about 0.8 to 1.

4. The method of claim 3, wherein the multiplication factor is about 0.9.

5. A method of minimizing the error rate of a digital recording system, including:

a) passing a recorded magnetic media past a magnetoresistive transducer;

b) measuring the amplitude of an output signal, $E_o$, from a magnetoresistive transducer for a first bias current through the transducer;

c) changing the bias current through the transducer at least twice;

d) measuring the amplitude of an output signal, $E_o$, from the transducer for each changed bias current;

e) normalizing the amplitudes of the signal outputs, $E_o$, by dividing each signal output, $E_o$, by its corresponding bias current, and determining the bias current for which the normalized output signal amplitude is maximized, $E_{nmax}$, thereby predicting an optimized bias current for which the system error rate is minimized; and f) setting the bias current approximately equal to the optimized bias current.

6. The method of claim 5, further including multiplying the bias current for by a multiplication factor within the range of from about 1 to 1.25.

7. The method of claim 6, wherein the multiplication factor is about 1.15.

8. A method of minimizing the error rate of a digital recording system, including:

a) passing a recorded magnetic media past a magnetoresistive transducer;

b) measuring the amplitude of an output signal, $E_o$, from a magnetoresistive transducer for a first bias current through the transducer;

c) changing the bias current through the transducer at least twice;

d) measuring the amplitude of an output signal, $E_o$, from the transducer for each changed bias current;

e) determining the bias current for which the output signal amplitude is maximized, $E_{omax}$;

f) normalizing the amplitudes of the signal outputs, $E_o$, by dividing each signal output, $E_o$, by its corresponding bias current, and determining the bias current for which the normalized output signal amplitude is maximized, $E_{nmax}$;

g) predicting an optimized bias current for which the system error rate is minimized by taking an average of the bias current for $E_{omax}$ and the bias current for $E_{nmax}$; and h) setting the bias current approximately equal to the optimized bias current.

* * * * *

UNITED STATES PATENT AND TRADEMARK OFFICE
CERTIFICATE OF CORRECTION

PATENT NO. : 5,390,054
DATED : February 14, 1995
INVENTOR(S) : Youngquist et al.

It is certified that error appears in the above-indentified patent and that said Letters Patent is hereby corrected as shown below:

On title under item [56] add:

--OTHER PUBLICATIONS

"Recording with Feedback-Controlled Effective Bias," Jensen, J. Audio Eng. Soc., Vol. 31, No. 10, October 1983, pp. 729-736

"Automatic Bias Control for MR Heads," Schwarz, IBM Technical Disclosure Bulletin, Vol. 21, No. 8, January 1979, pp. 3339-40--

Column 1, line 54, "ram" should read --rate--

Column 6, line 4, "for by" should read --for $E_{mmax}$ by--

Signed and Sealed this

Sixth Day of June, 1995

*Attest:*

BRUCE LEHMAN

*Attesting Officer*     *Commissioner of Patents and Trademarks*